June 4, 1929.  P. P. HARING  1,715,655
COTTON PICKING APPARATUS
Original Filed Feb. 2, 1923    3 Sheets-Sheet 1

Inventor:
Peter Paul Haring,
by Spenr. Middleton, Donaldson & Hall
Attys.

June 4, 1929.　　　P. P. HARING　　　1,715,655
COTTON PICKING APPARATUS
Original Filed Feb. 2, 1923　　3 Sheets-Sheet 2

Inventor:
Peter Paul Haring,
by Spar Middleton Donnersan Hall
Attys.

June 4, 1929.   P. P. HARING   1,715,655
COTTON PICKING APPARATUS
Original Filed Feb. 2, 1923   3 Sheets-Sheet 3

Inventor:
Peter Paul Haring,

Patented June 4, 1929.

1,715,655

UNITED STATES PATENT OFFICE.

PETER PAUL HARING, OF GOLIAD, TEXAS.

COTTON-PICKING APPARATUS.

Application filed February 2, 1923, Serial No. 616,570. Renewed July 9, 1927.

My invention relates to cotton picking machines and concerns the features and combination and arrangement of parts hereinafter described and particularly pointed out in the claims.

In the accompanying drawings:—

Figure 6:
Fig. 6 is an end face view of a picker.

The machine comprises two sets of picker arms indicated at 1, 2, each set being mounted on suitable carrier means driven by link belts or chains $a$ passing around suitable guide wheels, and driven in any suitable manner. The picker arms are provided with picker fingers of the form shown in Fig. 6, arranged at the ends of shafts 3, and adapted to engage the cotton and twist it from the boll, and carry it to a point of discharge. For discharging the cotton from themselves the picker fingers are given a reverse rotary motion, that is to say, in performing their picking actions the picker fingers will be rotated in one direction, i. e., in the direction in which they point, and for discharging the cotton they will be rotated in the opposite direction, so that in effect they withdraw themselves from the cotton.

For driving the picker fingers their shafts are provided each with a pinion meshing with a pinion on a shaft which is driven as hereinafter described from a gear 6 meshing with the racks 4 and 5 suitably fixed on the machine. It will be noticed that these racks are so located that the gear 6 as it travels with the carrier will be driven first in one direction and then in the other. While meshing with the rack 4 it will be driven forwardly to pick the cotton from the boll, but while meshing with the rack 5 the picker will be driven in the reverse direction to discharge the cotton, and the positions of these racks is such that as the machine is drawn along the row of plants the picker fingers will be rotated forwardly, while in contact with the plant to remove the cotton therefrom, and when the point is reached where the cotton is to be discharged, they will be rotated backwardly, and the discharged cotton will be taken by a conveyor 7 and delivered into any suitable receptacle.

Figure 9:
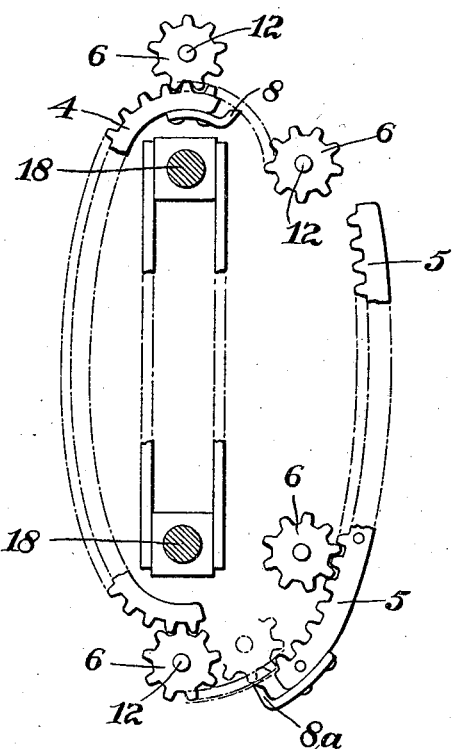
Figs. 9 and 10 are diagrammatic views illustrating the operation of means to insure the proper engagement of certain gears and toothed racks.
Figure 10:
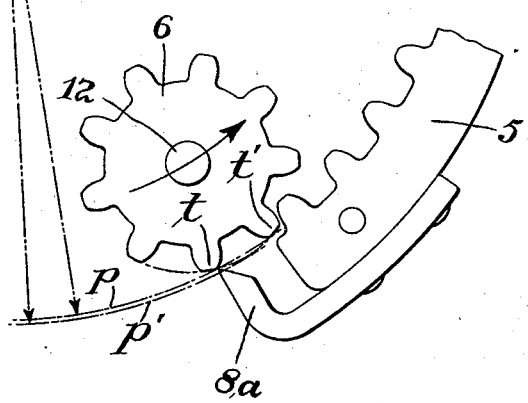

It will be seen that the gear 6 which drives the pickers leaves one rack 4 and thereafter engages the rack 5. These parts are so related that under normal conditions the gear 6 will mesh properly with the rack 5, but owing to vibration or from other causes the gear 6 may turn out of the position it assumed on leaving rack 4, and in order to insure that the gear 6 will be set in proper position to mesh with the rack 5 for the reversing of the picker fingers, I arrange a fixed finger 8 in position to engage and turn the gear 6, should it have gotten out of normal position, and thus insure that it engages the rack 5 properly. There is one of these aligning fingers at each gap in the rack system see 8, 8$^a$. The function of these fingers 8, 8$^a$ is illustrated in the diagrams Figs. 9 and 10. If the gear 6 arrives at the rack in the position to mesh properly therewith as shown in Fig. 10, the finger 8$^a$ will not be contacted by the teeth of the gear.

The teeth in such instance travel the path $p$. But if the gear 6 has turned on its axis to a position where its tooth $t$ instead of traversing the path $p$ travels along the arc $p'$, then it will strike the finger 8$^a$ and will be turned sufficiently to make the tooth $t'$ mesh properly with the rack which otherwise it would not do. It will be understood that there are a series of picker fingers on each arm, and that they are driven by shafts 9 extending lengthwise of the arms and imparting movement to the fingers by bevel gears 10. The shafts 9 are driven by the gears 11 from vertical shafts 12 carried by slats 13 carried by the chains or carriers *a*. These chains or carriers are guided so as to pass along a substantially elliptical path on each side of the row of plants, and the picker arms diverge slightly from the points where they are mounted by the slats on the chains or conveyors.

Suitable fixed guides are employed at 14, 15 for guiding the carrier chains, and these chains pass around sprocket wheels 16, 17, the drive taking place through vertical shafts 18 connected with the sprocket wheels 16. The vertical shafts are suitably driven as by the cross shaft 19 to which power is communicated from the wheels of the vehicle.

The conveyor belts 7 are of canvas and have points $7^a$ to engage the cotton. These belts also have sprocket chains 20 by which they are driven. These sprocket chains pass around suitably disposed sprocket wheels and the drive may take place from the cross shaft 19 as indicated. The canvas portion of the conveyor is clamped between cross strips 21 of metal and the points $7^a$ extend from one of these metal strips to engage the cotton. These metal strips are carried by hangers 23 of right angular form secured to the sprocket chains. As a result of this construction, the canvas portion of the conveyor will be depressed along the stretch *x* of the conveyor, from which portion the points $7^a$ extend upwardly, whereas in respect to the lower stretch *y* of the conveyor the relation of the parts is reversed, the canvas portion being elevated in respect to the sprocket chain. This construction brings the two stretches of the conveyor close together and economizes space.

Figures 5, 7:
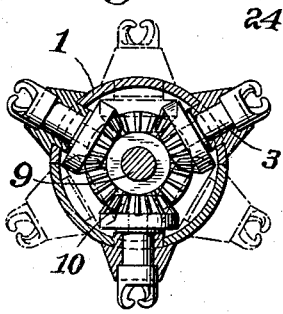
Fig. 5 is a cross section of Fig. 4 substantially on line 5—5 of Fig. 4, some of the parts being shown in elevation.
Fig. 7 is a sectional view of the conveyor with parts shown in plan view substantially on the line 7—7 of Fig. 3.

It also forms a trough-like structure which will prevent the cotton from being displaced laterally. This is shown in Fig. 7, and it will be noticed here that the sprocket chains form the side of this trough-like structure, the canvas forms the other side and the casing wall 24 of the conveyor box forms the other side, so that the cotton is confined while being conveyed.

Figure 1:
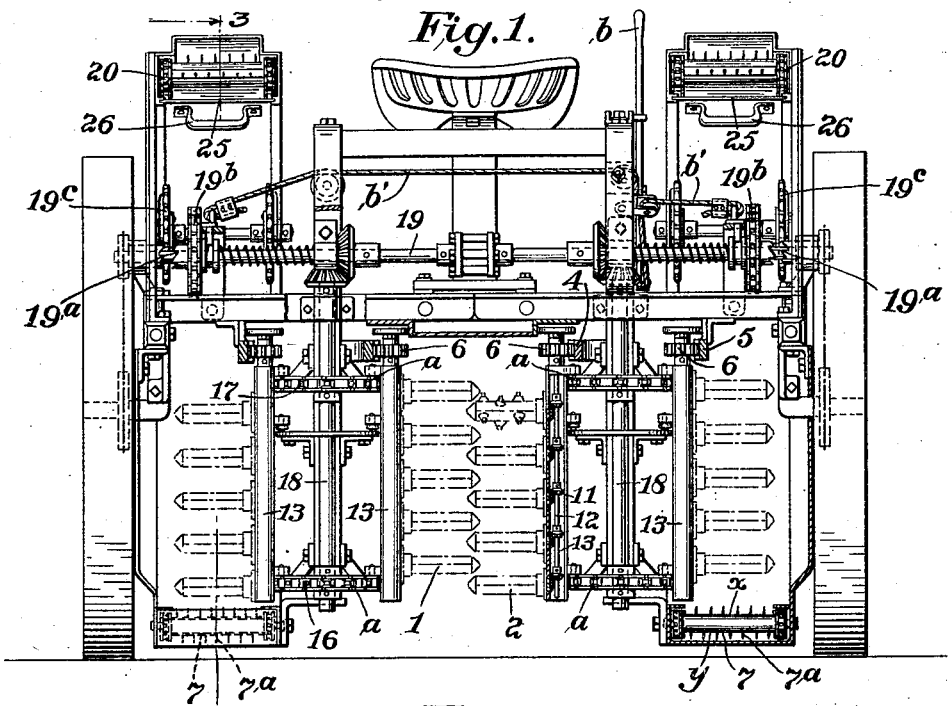
Figure 1 is a rear view of the machine with parts in section.
Figure 2:
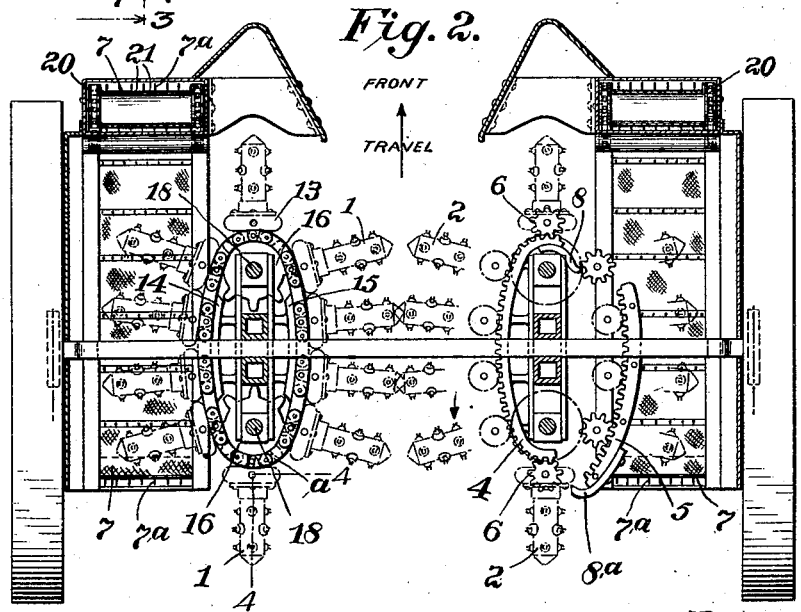
Fig. 2 is a plan view of diagrammatic form, showing the picker arms in dotted lines, the means for carrying them, conveyors and other parts.
Figure 8:
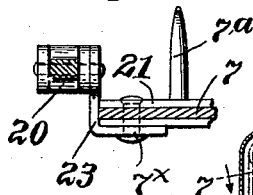
Fig. 8 is a detail view of a sprocket chain in section, and a part of the conveyor and one of the hangers.
Figure 3:
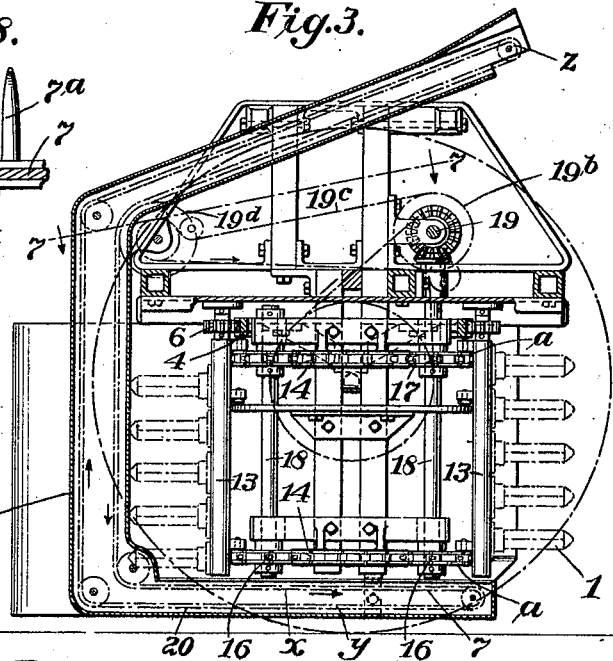
Fig. 3 is a vertical sectional view on line 3—3 of Fig. 1 through one of the conveyors, parts being shown in elevation.
Figure 4:
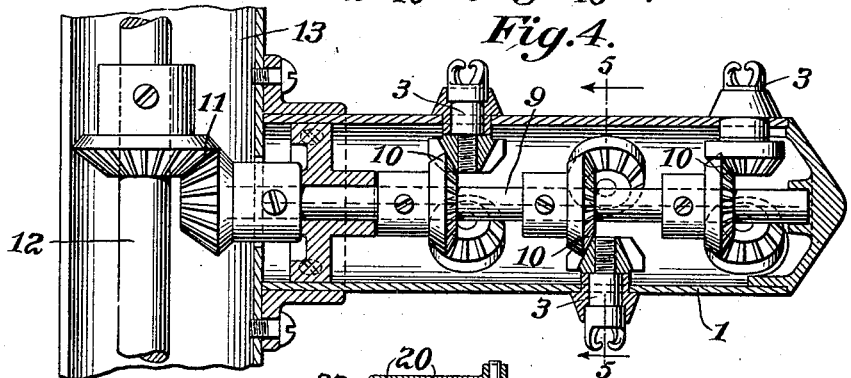
Fig. 4 is a sectional view along one of the picker arms on line 4—4 of Fig. 2.

In respect to the upper stretch *x* upon which the cotton is received from the picker mechanism, the trough-like structure exists here also, in that the chains form the sides of the trough. The pins $7^a$ project up from this stretch of the belt. The clamping strips are secured together to clamp the canvas between them in any suitable way, as by rivets $7^x$, as shown in Fig. 8. As will be seen from Fig. 3, the conveyor belt is continuous from its horizontal stretch to its uppermost point at Z, and besides its horizontal stretch it includes the vertical stretch and the inclined upper stretch. From the point Z the cotton is discharged into any suitable hopper or other receiver. The cross shaft 19 has clutches $19^a$ for controlling the transmission of power through the sprockets $19^b$, chains $19^c$, and sprockets $19^d$ to the conveyor chains, and these clutches will be operated by any suitable connections from the hand lever *b*, as for example the ropes *b'*. The casing 24 encloses the conveyor.

The bottom plates 25 of the upper portions of the conveyor casing may be removed by pulling on the handles 26.

I claim:

1. In an automatic cotton picking apparatus, a frame, carrying wheels, picker arms having rotary picker fingers, carrying means for the picker arms, gearing for rotating the picker fingers in one direction for picking the cotton and in the other direction for releasing the cotton at the point of discharge, said gearing including a gear wheel travelling with the carrier means, racks with which the gear wheel engages, one rack having teeth facing outwardly and the other rack having teeth facing inwardly to drive the gear in opposite directions, and aligning means to engage said gear on leaving one rack to make it register with the other rack should it be out of registering position, substantially as described.

2. In apparatus of the class described, picker arms arranged to work on opposite sides of a row of plants, a carrier for each set of picker arms, sprocket wheels about which the carrier moves, and curved guides fixed to the frame and cooperating with the sprocket wheels causing the picker arms to move along elliptical paths said guides being within the path described by the carrier, substantially as described.

3. In combination in a cotton picking machine, picker arms, picker fingers thereon, means for giving the arms a travelling movement and for rotating the picker fingers in one direction to pick the cotton and in the opposite direction to release it, a conveyor for the discharged cotton comprising sprocket chains, hangers extending therefrom, canvas held by said hangers in a plane to one side of the plane of the carrying chains, and points carried by the canvas body to engage the cotton, said conveyor being so disposed that in its parallel portions the canvas will lie in planes intermediate the planes of the chains, substantially as described.

4. In combination, sprocket chains carrying cotton picker means, curved guides for said chains within the path described thereby, sprocket wheels for said chains at the ends of the curved guides, the curves of which guides are outward in respect to a plane cutting the axes of the sprocket wheels, a frame upon which the curved guides are mounted, said curved guides and sprocket wheels causing the chains to travel along elliptical paths, and means for operating a sprocket wheel of each chain, said chains lying on opposite sides of the space receiving the plant, substantially as described.

5. In combination with cotton picker mechanism, a conveyor comprising a flexible strip, sprocket chains at each side edge of the strip, and hangers between the chains and the canvas strip whereby the latter is held to one side of the central plane passing through the chains, said canvas strip having points to engage the cotton, substantially as described.

6. In apparatus according to claim 1, said aligning means consisting of a finger in advance of the front end of each rack, substantially as described.

In testimony whereof I affix my signature.

PETER PAUL HARING.